(No Model.)

E. GRAUERT.
BICYCLE TIRE.

No. 529,261. Patented Nov. 13, 1894.

Witnesses
Edwin L. Bradford
Curtis Lammond

Edgar Grauert
Inventor
By Jas. C. McIntire
Attorney

THE NORRIS PETERS CO., PHOTO-LITHO., WASHINGTON, D. C.

UNITED STATES PATENT OFFICE.

EDGAR GRAUERT, OF NEW YORK, N. Y.

BICYCLE-TIRE.

SPECIFICATION forming part of Letters Patent No. 529,261, dated November 13, 1894.

Application filed October 16, 1893. Serial No. 488,291. (No model.)

*To all whom it may concern:*

Be it known that I, EDGAR GRAUERT, a subject of the Emperor of Germany, residing at New York, in the county of New York and State of New York, have invented certain new and useful Improvements in Bicycle-Tires; and I do hereby declare the following to be a full, clear, and exact description of the invention, such as will enable others skilled in the art to which it appertains to make and use the same.

My invention relates to certain new and useful improvements in tires for bicycles, and particularly to a class which my improvement may designate as mechanical rim tires.

My invention has for its object to provide tires for wheels now in use so that new tires may be readily supplied; and with this end in view my invention consists in so constructing the rim and tire that the former can be readily manipulated to mechanically secure the latter in place, or permit of a ready releasement of the same either wholly or in part as will be hereinafter more fully described and specifically claimed.

In order that those skilled in the art may fully understand my invention, I will proceed to describe the same referring by letters of reference to the accompanying drawings, in which—

Figure 1:
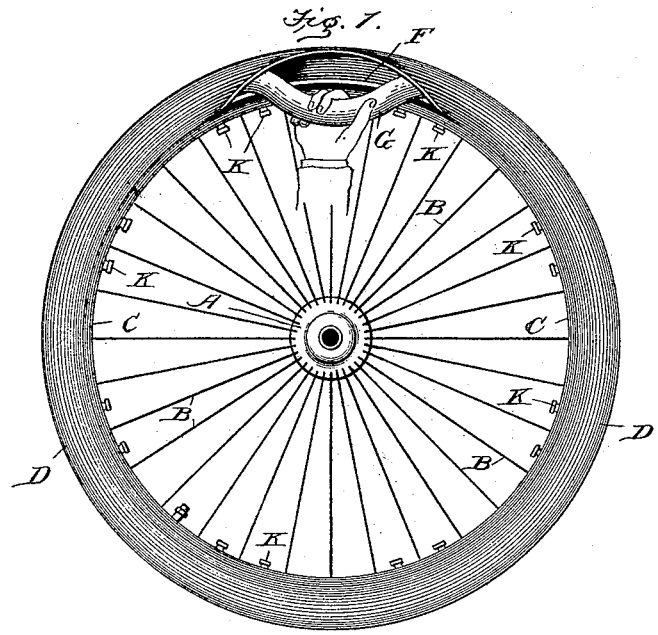
Figure 2:
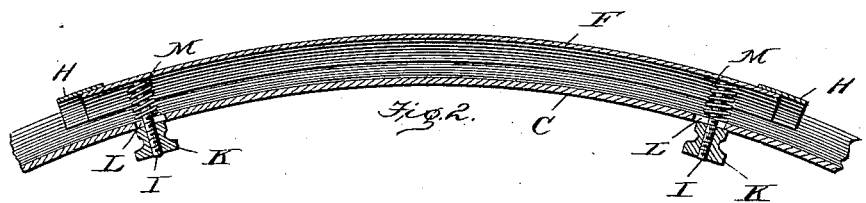
Figure 3:
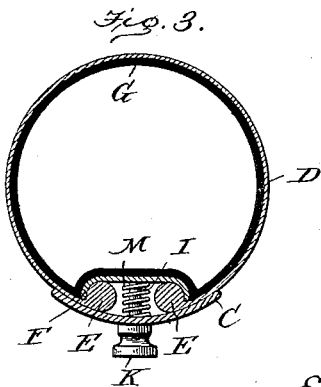

Figure 1 is a side elevation of a wheel with my improved tire, and showing one section of the inflatable tube removed sufficiently for inspection and repair. Fig. 2 is a longitudinal or vertical section on enlarged scale of the rim of the wheel; and Fig. 3 is a transverse or cross section of the rim and tire, showing plainly the manner in which the cover of the inflatable tube is secured in place by the mechanical appliances.

Similar letters designate like parts in the several views.

A is the hub and B the spokes of the ordinary construction.

C is the rim of the wheel to which the spokes are secured so that the nipples thereof will lie within the curvature or recess in the said rim, which is also adapted to form a properly curved seat upon which the edges of the cover D rest. This cover has its edges enlarged as seen at E, Fig. 3.

F is a cover clamp which is made in sections or segments and with its edges turned down to grasp the enlarged edges of the cover D, as clearly shown at Fig. 3.

G is the interior inflatable tube adapted to be seated upon the segment F. These segments F abut one another at their ends, and the joints are covered by a short scale H, (see Fig. 2) in such manner as to avoid the abrasion of the tube G and to constitute a continuity of the clamping segments so that no buckling of the covering can take place at the juncture of the ends of the segments proper should they not make a close joint. To the segments F, preferably near each end thereof, are secured pins I, the free ends of which are threaded, as clearly shown, and adapted to receive the securing nuts K.

The rim E is provided with holes L, as clearly shown at Fig. 2, through which the screw threaded pins I pass, and these holes are of larger diameter than the screw pins in order that proper latitude may be allowed for adjustment and movement of the clamping segments. The nuts K draw the segments into place as shown at Fig. 3, so that a space or throat of any desired proportion between the downwardly turned edges of the segment and the exterior curved surface of the rim C may be made, and the ends of the screw pins are shielded and concealed within the nuts.

In order to release any one or more of the clamping segments and thus permit of the removal of a part of the inflatable tube G, as shown at Fig. 1, or to release the entire tube, the nuts E are loosened and thereupon the coiled springs M force the segments F outward or away from the rim C a sufficient distance to permit the withdrawal of the enlarged edges of the cover D, and when it is desired to return the tube and its cover or shoe, it will be understood that the elastic force of the inflated tube and the pockets or enlargements of the cover or shoe cause each and both to spring back in place, whereupon the nuts K are tightened and thus the segments are again brought into clamping position.

I do not wish to be confined to the exact construction and arrangement of the pins and securing nuts as they may be varied to a considerable extent, or entirely substituted by any other suitable means for drawing down and securely fastening the segments in place, without departing from the spirit of my invention; and in lieu of the scales H for concealing the joints between the ends of the segments, any other suitable means may be employed, such for instance as reducing the alternate ends so that one end of each segment will fit over the adjacent end of the next.

From the construction shown, and the employment of the clamping segments F, it will be seen that the many thousands of wheels now in use having a rim such as I have shown, can be readily adapted for the use of the segments and thus converted to the use of tires in the manner described; and it will be seen that by reason of the construction and arrangement of the rim and segments, the retention of the covering or shoe is not dependent upon any direct clamping of the covering between the segments and the rim, thus requiring excessive strength of the parts, but that on the contrary the space or throat between the edges of the segments and the rim C may be so adjusted as to accommodate any inequalities in the thickness of the covering, and at the same time prevent the escape of the enlarged edges or beads of the covering.

Having described the construction and advantages of my improvements, what I claim as new, and desire to secure by Letters Patent, is—

1. The rim C curved outwardly as shown to receive the ends of the spokes and to form a seat for the cylindrical tire covering, in combination with the inflatable tube G, covering or shoe D with enlarged edges or beads E, clamping segments F, with edges turned toward the axis of the rim, and provided with scales or bridges H, and means for securing the segments in position, substantially as described.

2. The rim C and covering D constructed as described in combination with the covering D, segments F, screw threaded pins I, securing nuts K, and releasing springs M, substantially as and for the purpose set forth.

In testimony whereof I affix my signature in presence of two witnesses.

EDGAR GRAUERT.

Witnesses:
PERCY B. CANNING,
JOHN SALTER.